Figure 1:
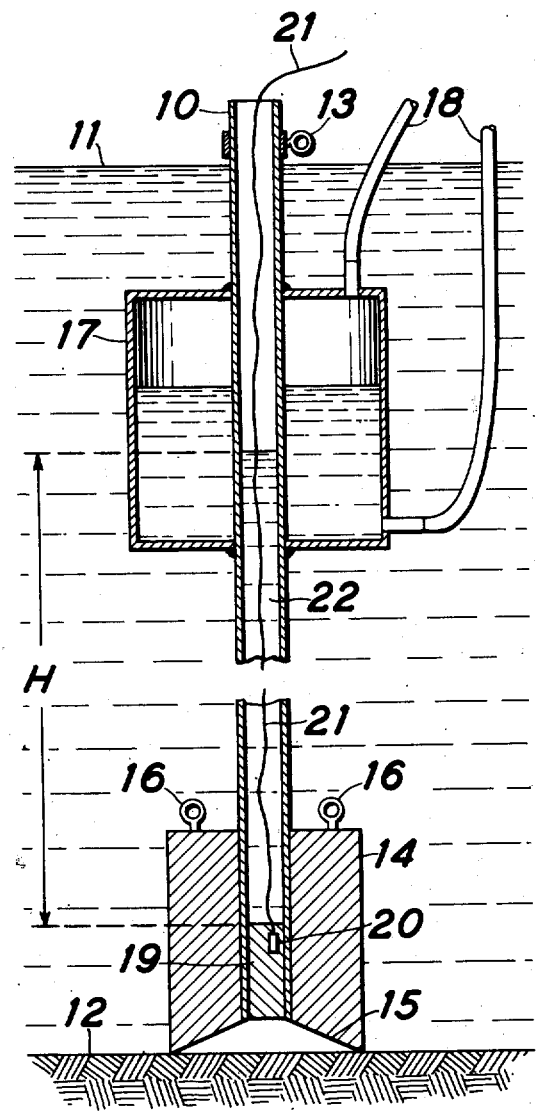

July 17, 1951        P. P. GABY        2,561,309

METHOD AND APPARATUS FOR SEISMIC UNDERWATER PROSPECTING

Filed Aug. 27, 1948

INVENTOR
Philip P. Gaby
BY
ATTORNEYS

Patented July 17, 1951

2,561,309

UNITED STATES PATENT OFFICE 2,561,309

METHOD AND APPARATUS FOR SEISMIC UNDERWATER PROSPECTING

Philip P. Gaby, Oakland, Calif., assignor, by mesne assignments, to California Research Corporation, San Francisco, Calif., a corporation of Delaware Application August 27, 1948, Serial No. 46,418

4 Claims. (Cl. 181—.5)

This invention relates to an improvement in the seismic method of exploring the subsurface strata of the earth and more particularly to a method and apparatus for locating strata, part or all of which may be beneath a body of water. An explosive charge is fired below the surface of the water and in substantially direct contact with the earth so that the seismic waves which are thereby generated pass into the earth and are reflected from, or refracted through various strata to one or more vibration detectors connected to suitable amplifying and recording equipment. The principal object of the invention is to provide a method and means for locating and detonating the explosive so that the amount of explosive may be reduced to a minimum and the seismic waves generated thereby may be most efficiently utilized.

In detonating explosives under water, the depth beneath the surface at which the charge is placed has an important bearing on the nature and utility of the seismic waves which are thus produced. First, if the charge is not placed on or near bottom, a large portion of the useful energy is lost by reflection at that interface. Secondly, it is desirable that the explosive charge be placed on the bottom or at least at a considerable depth below the surface of the water in order that an adequate tamping effect may be obtained from the column of water above the charge so that the amount of explosive may be kept to a minimum value and still obtain useful records.

Under ordinary conditions, if the charge is placed sufficiently deep as indicated by those two factors, the explosion produces a bubble of gas in which secondary vibrations or oscillations exist which are imparted to the surrounding body of water before the gas bubble driven upward only by the buoyancy of the bubble reaches the surface and bursts. The secondary vibrations are thereby superimposed upon the primary impulse from the explosion, and the result is a confused record on the seismogram as though several charges of explosive had been fired at spaced intervals of time. The effect of this phenomenon is described at some length in U. S. Patent 2,351,524 issued June 13, 1944, to R. L. Lay et al. The procedure advocated in that patent involves the step of suspending the explosive at such a short distance below the surface of the water that the bubble of gas from the explosion of the charge will burst before secondary oscillations can be set up so that only the primary impulse from the explosion is received on the seismograph.

The principal disadvantage of this procedure is that it requires excessively large charges because of the lack of adequate depth of water to give the required tamping effect, and because of the loss of energy through reflection at the bottom of the water. The extremely large charges which must be used increase the cost of the operation, and in addition set up such intense shock effects in the surrounding water that marine life is damaged over a considerable distance from the point of the explosion. This damage has resulted in the restriction of seismographic surveying in certain off-shore areas by governmental agencies concerned with the conservation of marine life.

This invention comprehends broadly a method and apparatus for seismic prospecting beneath a body of water which avoids certain of the disadvantages heretofore encountered and permits obtaining satisfactory records from a very small charge of explosive placed at the most desirable position with respect to the bottom of the body of water. It provides for suitable tamping by a water column of adequate height which may be equal to, greater or less than the depth below the surface at which the charge is placed, and eliminates the objectionable secondary vibrations of an unconfined explosion by directing a controlled and limited amount of tamping fluid as well as the gaseous products of the explosion so that they are expelled to the atmosphere by the pressure created by the confined explosion.

One means for accomplishing these results is the provision of a readily portable and self-supporting conduit or casing which extends from a point above the surface of the water to the bottom with means in the casing for placing and retaining the explosive charge substantially at the bottom. By these means the depth of tamping liquid may be adequately controlled, and the desired single primary impulse transmitted to the earth at the bottom of the body of water by placing the explosive substantially directly thereon. This results in the most effective use of the explosive with the minimum of disturbance to the surrounding body of water and a complete absence of the secondary vibrations which are encountered when the explosive is detonated in water of comparable depth and without the use of the confining casing or conduit just described.

It is an object of this invention to provide an improved method and apparatus for placing an explosive at the bottom of a body of water and above subsurface formations which are to be explored by seismic prospecting.

A further object is to provide an improved apparatus for confining the effect of an explosive used in seismograph surveying under water, which may be reused an indefinite number of times and in which a controlled depth of tamping material may be employed which can be independent of the depth at which the explosive is placed beneath the surface of the water.

A further object is to prevent secondary oscillations which would obscure and confuse the seismographic record of the primary impulse of the explosion by confining the effects of the explosion and releasing the tamping liquid and the gases resulting from the explosion and directing them to the atmosphere substantially out of contact with the main body of water.

These and other objects and advantages will be further apparent from the following description and from the attached drawing which forms a part of this specification and illustrates a preferred embodiment of means for practicing the invention, as well as an alternative form.

Figure 2:
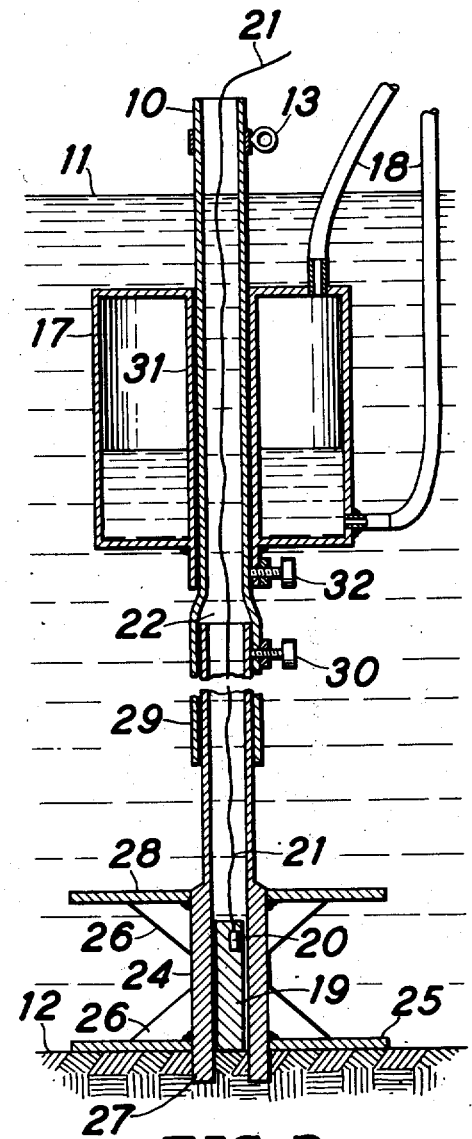

In the drawing, Figure 1 is a vertical sectional view of one form of this invention, in which a heavy mass or weight is used to keep the lower end of the conduit in contact with the earth. Figure 2 is a vertical sectional view of an arrangement in which extended surfaces are used to keep the conduit upright and in contact with the earth.

In the drawing, reference number 10 designates a casing or conduit which may be of light strong metal extending from a point above the surface of the water 11 in which the survey is to be made to the bottom or earth 12 below. A hoisting ring 13 or similar means may be provided near the top of casing 10 so that it may be handled by a crane or boom on a boat or barge from which casing 10 may be lowered into position.

A base member 14 which may be of steel or other material having a relatively high tensile strength and density forms a heavy mass at the lower end of the casing and holds it firmly in contact with the bottom 12. Member 14 also acts to reinforce conduit 10 and prevent it bursting from the effect of the explosion which takes place inside of that conduit at its lower end. Desirably but not necessarily the lower face 15 of weight 14 may be concave, but its general configuration depends on the type of material forming the bottom or sea floor. Also the interior diameter near bottom may be enlarged to provide a larger firing chamber for the explosive charge. Rings 16 may be provided at the top of weight 14 to facilitate handling by the hoisting means mentioned above.

Near the upper end of conduit 10, means such as a buoyant tank 17 are secured to stabilize the structure in the water 11. The degree of buoyancy in tank 17 may be controlled by admitting or displacing water through hoses 18.

An explosive charge 19 is positioned at the lower end of conduit 10 within the base member 14, the latter serving to reinforce and thus to prevent the conduit from bursting when the charge is detonated. This operation is carried out by the usual detonator 20 which is actuated by an electric impulse through insulated cable 21 leading upwardly through conduit 10 to the boat or barge on which the control equipment (not shown) is located.

The explosive charge 19 is positioned in or immediately above the open lower end of conduit 10 and is secured therein by any suitable means, not shown. The tamping liquid 22 which may be water or mud fluid for charge 19 may be of any desired height H up to the total length of conduit 10. Height H is of such magnitude as to give adequate tamping effect upon explosive charge 19. Conduit 10 acts to confine the effect of the explosion to drive the tamping liquid 22 upwardly to the top of the conduit where the liquid and gases are released freely to the atmosphere. This prevents secondary vibrations at those depths where the most desirable results are obtained. Also the surrounding body of water 11 is not materially disturbed and the destruction of marine life is limited substantially to the small area immediately adjacent the lower end of weight member 14.

One effect of weight member 14 at the moment of explosion is to keep the conduit 10 substantially in contact with the earth at 12 for a long enough time to permit the tamping liquid 22 and the gases from the explosion to be expelled through the open upper end of conduit 10 into the atmosphere.

An alternative arrangement embodying this invention is illustrated in Figure 2 in which the weight member 14 is replaced by a somewhat thinner reinforcing ring 24 and a bottom plate 25. Member 24, which may be a thickened portion at the lower end of conduit 10, is secured to a flat metal plate 25, by means such as gusset plates 26, and may extend a short distance below that plate as at 27. The upper face of plate 25 acts upon the water 11 to prevent the upward motion of conduit 10 and its associated parts at the moment of explosion and while the tamping liquid 22 and products of the explosion are traveling upward to be released at the top of conduit 10. The intimate contact between the lower face of plate 25 and the bottom 12 will also serve to restrain upward motion of the assembly under the circumstances just described. If desired, additional fluid braking plates 28 may be secured to conduit 10 as illustrated in Figure 2.

Where various depths of water may be encountered, it is desirable to provide means for adjusting the over-all length of conduit 10 as by a sliding joint or coupling designated 29, which may be secured in the desired position by a setscrew 30. It may be desirable to provide similar adjusting means for tank 17 by providing an inner sleeve 31, thus making it annular in cross section and arranged to slide longitudinally on the upper end of conduit 10 and to be secured thereto by clamping means generally designated 32.

In Figure 1 the explosive charge 19 is illustrated as completely filling and thereby circumferentially sealing the lower end of conduit 10 so that the height H of tamping liquid 22 may be less or greater than the total depth of the body of water 11. Other sealing arrangements could be substituted, such as a frangible diaphragm or plug.

In the embodiment of Figure 2 the explosive charge 19 is illustrated as being smaller in diameter than the inside of conduit 10 so that the charge may be lowered into the conduit after the latter is placed in position in the body of water 11 where the shot is to be fired. Under such circumstances the bore of conduit 10, which is open at both ends, will normally be filled with water as it is placed in position so that the height H of the tamping liquid will be equivalent to the depth of the body of water 11. Due to the confining action of conduit 10 this height is not in any way dependent upon the size of charge 19 so long as the latter is adequate to eject the tamping fluid from the bore of conduit 10.

From the foregoing description it will be appreciated that this invention comprehends broadly an improved method of placing an explosive substantially in contact with the earth below a body of water where seismographic surveying operations are to be carried out. It involves the isolation of the explosive and the tamping liquid thereabove from the main body of water, one example of means for accomplishing this being the provision of a readily portable open-ended conduit which rests upon the bottom and extends upwardly to a point above the surface of the water so that the tamping liquids and the products of the explosion may escape freely within a desired interval, without the production of secondary vibrations in the main body of water.

Although only two examples of apparatus for practicing the procedures outlined have been described and illustrated, it is obvious that numerous changes and modifications could be made in the equipment and in the procedure for placing and detonating the explosive without departing from the invention, and all such changes as are included within the scope of the appended claims are embraced thereby.

I claim:

1. In underwater seismic surveying, the steps of placing an isolated explosive charge in substantially direct contact with the surface of the earth below an unconfined body of water, exploding said charge, and directing products of the explosion in a confined continuous stream to the atmosphere and under the influence of the primary impulse from said explosion, whereby occurrence of secondary waves in said body of water is prevented.

2. In a system for seismic exploration in which the firing of a charge of explosive placed at the bottom of an unconfined body of water is used to generate seismic waves at such a depth that said explosive would produce secondary seismic waves if it were fired in an unconfined condition, means comprising an open-ended, rigid, non-frangible conduit adapted to extend throughout the depth of said unconfined body of water and to extend above the surface thereof, and means associated with said conduit for maintaining said conduit upright and with its lower end in contact with the bottom of said water body.

3. A system according to claim 2 in which said conduit forms a continuous passage open at both ends, the lower end being reinforced to withstand bursting, and said explosive is placed within said reinforced lower end thereof.

4. A system according to claim 2 in which said last-named means comprises a weight member at the lower end of said conduit and a buoyant member adjacent the upper end of said conduit.

PHILIP P. GABY.

REFERENCES CITED

The following references are of record in the file of this patent:

UNITED STATES PATENTS

| Number | Name | Date |
| --- | --- | --- |
| 133,863 | Knapp | Dec. 10, 1872 |
| 2,272,741 | Failing | Feb. 2, 1942 |
| 2,334,414 | Klotz | Nov. 16, 1943 |
| 2,351,524 | Lay et al. | June 13, 1944 |
| 2,407,442 | Parr | Sept. 10, 1946 |